UNITED STATES PATENT OFFICE.

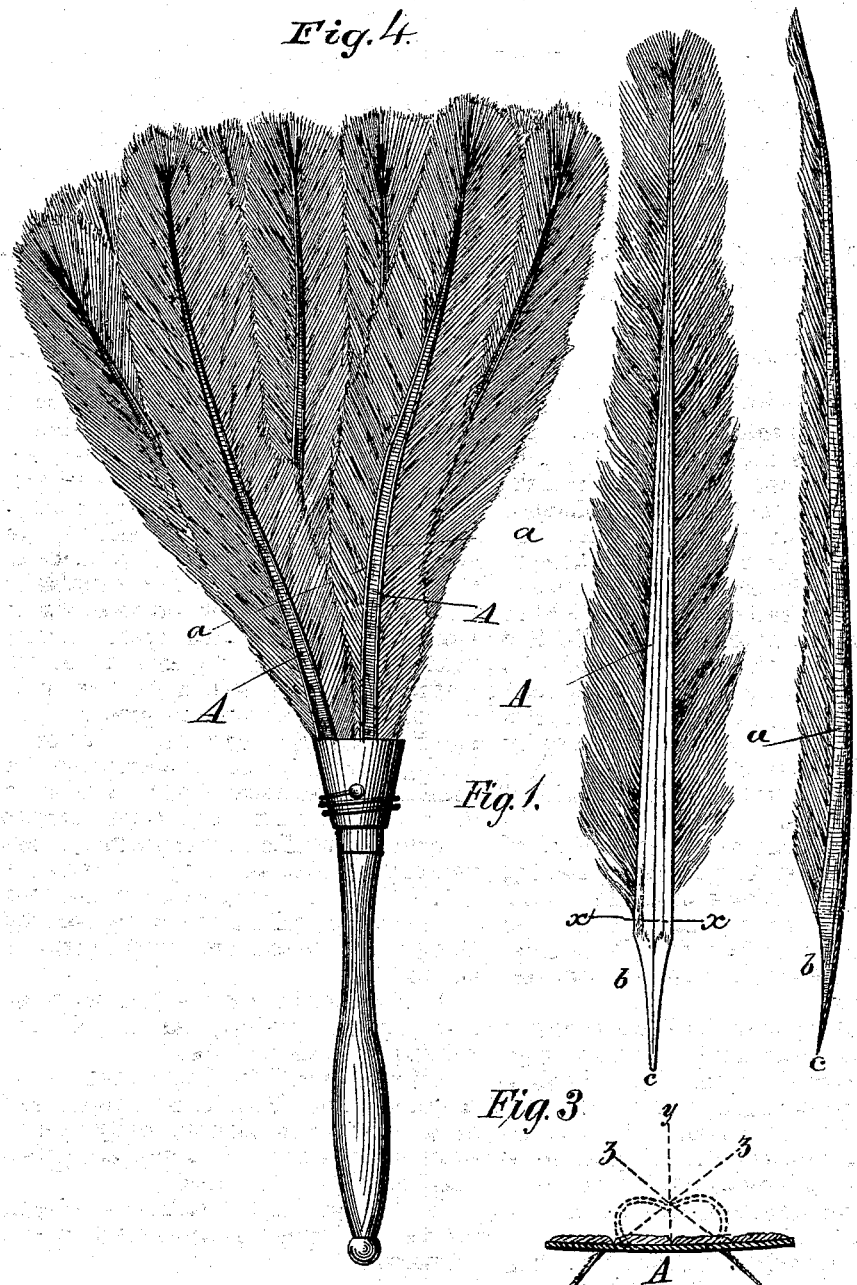

JOHN W. LITTLE, OF MUNCIE, INDIANA.

FEATHER DUSTER.

SPECIFICATION forming part of Letters Patent No. 271,877, dated February 6, 1883.

Application filed November 10, 1882. (Model.)

*To all whom it may concern:*

Be it known that I, JOHN W. LITTLE, of Muncie, in the county of Delaware and State of Indiana, have invented certain new and useful Improvements in Feather Dusters; and I do hereby declare that the following is a full, clear, and exact description thereof, reference being had to the accompanying drawings, and to the letters of reference marked thereon, which form part of this specification, in which—

Figure 1 shows a feather having its split or centrally-cut portion pressed open. Fig. 2 is a longitudinal section through the center of a feather in which the stem has been split and its pith removed. Fig. 3 is an enlarged section through the line $x\,x$, Fig. 1, showing by dotted lines the mode of cutting the stem. Fig. 4 is a view of a feather duster made of my prepared feathers.

This invention relates to a novel method of preparing feathers for the purpose of making them very flexible or pliable and better adapted for the manufacture of feather dusters, as will be fully understood from the following description, when taken in connection with the annexed drawings.

In carrying out my invention I take a feather and by a suitable instrument I make a longitudinal cut through the inner part of the shell of the stem A, extending from one end of the stem to the other. The stem is not cut entirely through, as I have shown in Fig. 3, wherein the dotted line $y$ indicates the position of the central cut and its extent of depth into the body of the stem.

If desired, I may split the stem by making two slanting cuts extending from the center of the stem outwardly, but not continued entirely through the stem, as I have indicated by the dotted lines $z\,z$, Fig. 3. The feather-stem A is then opened and crushed or pressed, and the pith removed by rasping devices; or, if desired, the pith may be removed without crushing the stem; or where the feather-stem is prepared with two inclined cuts extending lengthwise of the stem, as described above, the stem need only be crushed to condense the pith. By thus cutting the stem of a feather it can be readily pressed, and, if desired, the pith removed without splitting the stem entirely through, thus making it more durable than it would be if the stem were crushed without previously cutting it, as described. Another advantage gained by my method of treating feathers is that I leave the shell of the ridges on the feathers at $a\,a$ and protect the plumage from tearing away when the duster is used. In Figs. 1 and 2, I have represented the quill portion $b$ of the stem A tapering off to a point, $c$; but this forms no part of my invention.

Having described my invention, I claim as new and desire to secure by Letters Patent—

1. A feather having its stem cut longitudinally, opened, and pressed or crushed, substantially in the manner and for the purposes described.

2. A feather having its stem cut longitudinally, opened, crushed, and the pith removed, substantially as described.

3. The new article of manufacture consisting of a feather duster the stems of the feathers of which are cut longitudinally, opened, and crushed without removing any part of the shell, substantially as described.

In testimony that I claim the foregoing as my own I affix my signature in presence of two witnesses.

JOHN W. LITTLE.

Witnesses:
 A. H. HAMILTON,
 ELMER E. WALLACE.